United States Patent
Breitgand et al.

(10) Patent No.: US 9,047,111 B2
(45) Date of Patent: Jun. 2, 2015

(54) RESOURCE ALLOCATION IN A VIRTUALIZED COMPUTING ENVIRONMENT

(75) Inventors: David Breitgand, Modiin (IL); Amir Epstein, Herzelia (IL); Yosef Moatti, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 165 days.

(21) Appl. No.: 13/604,640

(22) Filed: Sep. 6, 2012

(65) Prior Publication Data

US 2014/0068609 A1    Mar. 6, 2014

(51) Int. Cl.
  G06F 9/455    (2006.01)
(52) U.S. Cl.
  CPC .. *G06F 9/45533* (2013.01); *G06F 2009/45566* (2013.01); *G06F 9/45558* (2013.01)
(58) Field of Classification Search
  CPC ............................................. G06F 2009/45566
  See application file for complete search history.

(56) References Cited

U.S. PATENT DOCUMENTS

| 7,269,652 | B2 | 9/2007 | Chen et al. | |
| 8,830,842 | B2 * | 9/2014 | Kano | 370/241.1 |
| 2008/0295096 | A1 | 11/2008 | Beaty et al. | |
| 2009/0238078 | A1 | 9/2009 | Robinson et al. | |

FOREIGN PATENT DOCUMENTS

JP    2011039740    2/2011

OTHER PUBLICATIONS

Chen et al., "Effective VM Sizing in Virtualized Data Centers", 2011 IFIP/IEEE International Symposium on Integrated Network Management (IM), pp.: 594—601, May 2011.
Meng et al., "Efficient Resource Provisioning in Compute Clouds via VM Multiplexing", Proceedings of the 7th international conference on Autonomic computing, pp. 11-20, 2010.
Wang et al., "Consolidating Virtual Machines with Dynamic Bandwidth Demand in Data Centers", 2011 Proceedings IEEE INFOCOM, pp.: 71—75, Apr. 2011.

* cited by examiner

*Primary Examiner* — Camquy Truong
(74) *Attorney, Agent, or Firm* — Jason H. Sosa; Suzanne Erez (57) ABSTRACT

Machines, systems and methods for deciding whether a plurality of virtual machines (VMs) may be hosted on a computing system with resources to support at least one of the VMs, the method comprising determining maximum permissible probability of infringement (maxPermInfrProb(v)) for a VM(v), wherein "v" is a value from 1 to n, such that n is the number of VMs in a set G, as stipulated by the VMs' SLA, wherein "v" is a value from 1 to n, such that n is the number of VMs in a set G; partitioning the set G into a plurality of groups $G_i$ ($G_1, \ldots G_i, \ldots G_n$), so that each group is homogenous with respect to maxPermInfrProb defined for members of the group $G_i$; and organizing the groups $G_i$ based on the value of maxPermInfrProb for each $G_i$.

12 Claims, 6 Drawing Sheets

RESOURCE ALLOCATION IN A VIRTUALIZED COMPUTING ENVIRONMENT

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to allocating resources to virtual machines (VMs) with non-homogenous service level agreements (SLAs), and more particularly to allocating resources to the VMs based on the respective permissible infringement probabilities of the corresponding SLAs.

BACKGROUND

Infrastructure as a service (IAAS) is a service that allows a service provider to sell computing services and resources. IAAS services are generally provided without requiring the end user to know the location and other details of the provided infrastructure and allow for the utilized resources to be stored and deployed on server systems or databases that are remotely provisioned.

An IAAS is generally implemented to take advantages of economies of scale and may be used to (1) minimize the total cost of ownership of the provided infrastructure by optimizing the allocation of resources to virtualized systems (e.g., VMs) that are utilized to provide the services, and (2) meet the defined SLAs for a VM to the extent possible. Typically, if an SLA associated with a requested VM is infringed, then a certain fine is imposed against the service provider for breach of the SLA-defined provisions.

Given the limitations associated with the underlying infrastructure, it is desirable to allocate as much workload as possible to the virtualized resources, while keeping the SLA infringements under the limit permitted by the respective SLAs. The over commitment of resources has to be properly done in order to be most effective in terms of the minimization of the total cost of ownership, while generating controlled and acceptable levels of SLA infringement.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

Machines, systems and methods for deciding whether a plurality of virtual machines (VMs) may be hosted on a computing system with resources to support at least one of the VMs, the method comprising determining maximum permissible probability of infringement (maxPermInfrProb(v)) for a VM(v), wherein "v" is a value from 1 to n, such that n is the number of VMs in a set G, as stipulated by the VMs' SLA, wherein "v" is a value from 1 to n, such that n is the number of VMs in a set G; partitioning the set G into a plurality of groups $G_i$ ($G_1, \ldots G_i, \ldots G_n$), so that each group is homogenous with respect to maxPermInfrProb defined for members of the group $G_i$; and organizing the groups $G_i$ based on the value of maxPermInfrProb for each $G_i$.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
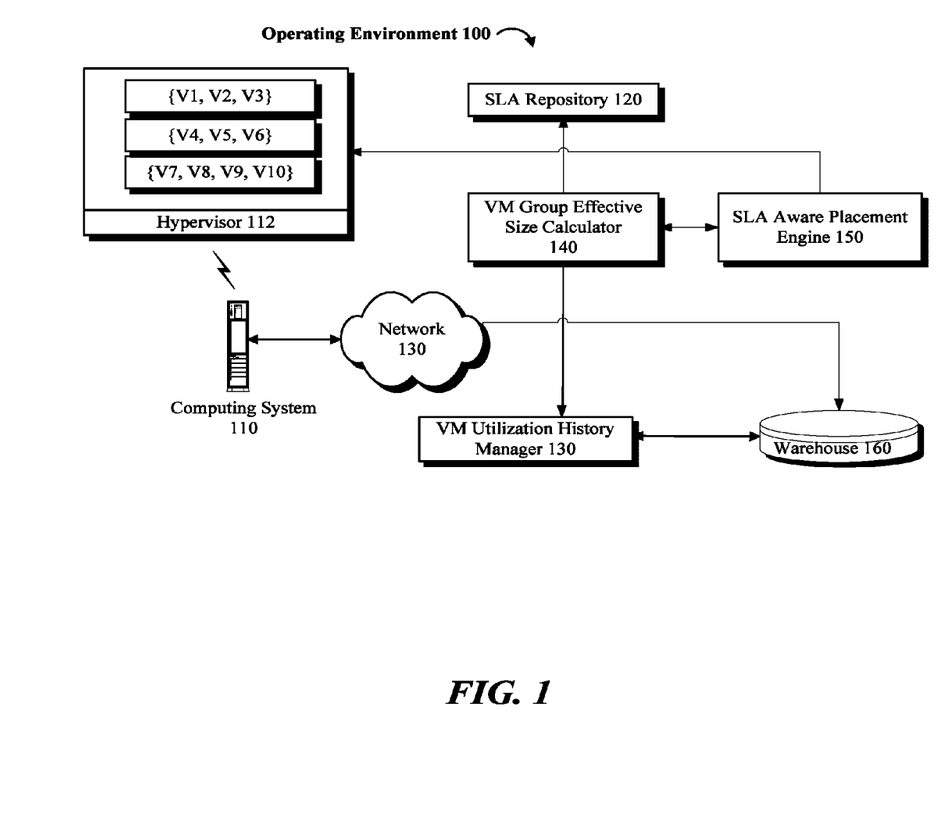
FIG. 1 illustrates an exemplary operating environment in accordance with one or more embodiments, wherein virtual machines are implemented to service a plurality of requests.

Referring to FIG. 1, in a virtualized computing environment, one or more VMs (e.g., V1, ..., V10) may operate over a hypervisor 112 configured to manage the execution of the VMs over a computing system 110, hereafter also referred to as a host or host machine. A VM may have a certain level of demand for utilizing the resources (e.g., CPU or memory) of computing system 110. The SLA associated with a VM may identify the resource requirements for that VM.

A given VM ("v") has a maximum permissible probability of infringement (i.e., maxPermInfrProb(v)), which is dependent on the requirements of its associated SLA. Given multiple VMs, a certain level of resources on the host may be allocated to each VM, according to a certain priority. For a VM, the defacto infringement probability (i.e., deFactoInfrProb(v)) may be calculated as the function of (1) the level of allocated resources for the VM; (2) the level of allocated resources for the other VMs located in the host; and (3) the allocation priorities of the VMs over the host.

It is noteworthy that when the maxPermInfrProb(v) is identical for the VMs in the host (i.e., homogenous across the VMs), then the minimum host capacity may be calculated to ensure that deFactoInfrProb(v) will be at most equal to maxPermInfrProb(v). The minimum host capacity may not be properly calculated, in one or more embodiments, when maxPermInfrProb of the VMs are not homogeneous. Note that a globally enforced SLA scheme which would enforce for all the VMs a probability of infringement maxPermInfrProb corresponding to the most stringent SLA is generally impractical because such scheme would result in waste of resources due to a lack of consideration for different SLA requirements.

In a computing environment with non-homogeneous VMs, some host resources may be underutilized (i.e., certain resources may remain idle) while other resources are overutilized. Workload segregation according to the VMs' SLA may be used to avoid the above effect. However, workload segregation may lead to the management of different resource pools, each being homogenous in terms of SLA requirements, causing additional management overhead due to the increase in the number of pools, and also the fragmentation of resource usage.

A monitoring component may be utilized to monitor resource usage (e.g., CPU utilization) of the VMs running on hypervisor 112 on computing system 110 and store the collected data in the form of, for example, time series into warehouse 160 available over Network 130. In one implementation, data about hardware configuration of computing systems hosting one or more VMs may be stored in warehouse 160. Periodically or on demand, an SLA-aware placement engine 150 may be used to deploy a new VM. SLA-aware placement engine 150 may select a candidate host (e.g., hypervisor 112), and retrieve the SLAs of the VMs running on top of one or more candidate hosts.

SLA-aware placement engine 150 may call a VM group effective size calculator 140, passing to it the SLA of the new VM and the SLAs of the VMs running on hypervisor 112. VM group effective size calculator 140 may calculate the effective size for a group of VMs using the data stored in warehouse 160. As an example, if effective size of the VM group is smaller or equal to the CPU capacity of the candidate host, effective size calculator 140 computes the new CPU share allocation for the VMs of the candidate host and passes the result to SLA-aware placement engine 150 to indicate that the host is suitable or that the search for a suitable host should continue.

Accordingly, given a host and a set of candidate VMs to be hosted thereon, the probability for infringement of SLA provisions for one or more of the candidate VMs may be calculated by way of statistical analysis, for example. Such calculation may be used to determine whether a set of candidate VMs is fit to service requests for resources without infringing the SLA provisions for the VMs, prior to the allocation of resources to the VMs and the deployment of the VMs.

In accordance with one embodiment, the effective size of a group of VMs with respect to infringement probability p associated with that group of VMs may be calculated. As an example, for a group of VMs comprising sub-groups of VMs with different SLA requirements, the total effective size is computed in a way that the different infringement probabilities of each sub-group is taken into consideration by avoiding the application of a uniform effective sizing scheme to the VMs that have different maximum permissible probability of infringement of SLAs.

For example, when a VM is to be provisioned on a host, different factors such as the amount of resources needed and also the relative priority of other VMs may be considered, so that the host resources are appropriately shared with the higher priority VMs to the extent possible, particularly if there is a contention for access to resources. According to one implementation, prior to resource allocation, it is determined if one VM is given a higher priority over another VM. If so, when contention occurs, more resources may be allocated to VM1 and a relatively lesser amount of resources may be allocated to VM2. As such, the resources are allocated according to the level of relative priority among the VMs.

The level of priority may be defined based on different factors. For example, a VM that is assigned a higher workload may be deemed more deserving of additional resources and thus assigned a higher priority than a counterpart VM with a lower workload. The VMs may be grouped according to a priority hierarchy so that a respectively greater share of resources is allocated to the group of VMs that are higher on the priority hierarchy. In this manner, the more important, the more valuable or the more deserving groups of VMs are given a higher placement in the hierarchy.

For example, consider a host H and a collection G of VMs hosted on H. G may be partitioned into the sub-groups $G_1$, $G_2$, ..., $G_n$, where the VMs in a sub-group $G_i$ are homogenous in terms of SLA requirements such that $p_i$ designates the associated permissible infringement probability. The sub-groups $G_i$ may be sorted in increasing order of $p_i$, where $p_{i+1}$ is larger than $p_i$. This grouping and ordering scheme is particularly useful in SLA practices where the various SLAs significantly differ from each other.

Accordingly, $p_i$ is the permitted infringement probability for the VMs that are the members of the sub-group $G_i$. For each sub-group $G_i$ the induced probability $p'_i$ may be defined as $p'_1 = p_1$ and $p'_i = p_i - p_{i-1}$ for $1 < i \leq n$, where to each sub-group $G_i$ a priority($G_i$) is assigned, such that priority($G_i$)>priority($G_{i+1}$) and each sub-group $G_i$ will be given a sufficiently high preference over a sub-group $G_j$ for $j > i$. As such, resources may be allocated to $G_j$ if the demands of sub-groups $G_i$ with $i < j$ are met. Accordingly, a group with a lower normalized probability of infringement may be given priority over a group with a higher normalized probability of infringement.

In one implementation, a group $G_i$ may be defined as a pool of resources where each sub-pool has no reservation and no maximum and also where the associated share: Share($G_i$) is defined as Share($G_i$)=r*Share($G_i$+1), where the constant ratio r is sufficiently large (e.g., at least 100) so that resources may be allocated to group $G_i$ if the needed resources have fully been allocated for preferably all groups $G_k$ such that k<i.

The effective size (ES) for a group G of VMs with maximum permissible infringement probability p may be defined by:

$$ES(G,p) = \Sigma_{j \in G} \mu_j + Z\alpha(\Sigma_{j \in G} \sigma_j^2)^{1/2}$$

where $\mu_j$ and $\sigma_j$ denote the mean and standard deviation of the resource demand of each VM j in group G, and $\alpha=1-p$ and $Z\alpha$ denote the α-percentile of the unit normal distribution N(0,1).

In one embodiment, the total effective size of G may be computed as provided below based on a conservative effective size estimation of the effective size of the co-hosted VM mix:

$$ES(G)=\Sigma_i ES(G_i, p'_i)$$

In another embodiment, the total effective size of G may be calculated as follows:
Induced probability $p'_i$ defined as provided above.
Compute effective size for each group
Define $G'_i$ as the union of the sub groups $G_j$ for j≤i:

$$G'_i = U_{j\leq i} G_j$$

Compute ES(G) as: $ES(G)=Max_i\ ES(G'_i, p'_i)$

The above computation scheme for ES(G) may be deemed more effective than the computation detailed in the earlier scheme. Regardless, in either implementation, using the union bound from probability theory, the probability of an infringement for group $G_i$ is at most $p_i$ in both embodiments.

For example, referring back to FIG. 1, let's assume 10 VMs (e.g., V1, V2, ..., V10) are to be placed on a given host H without violating the infringement probability of the VMs. The VMs may be, for example, divided in three groups in terms of maximum permissible infringement probability:
G1—with infringement prob. p1=0.01%
G2—with infringement prob. p2=0.1%
G3—with infringement prob. p3=1.0%
where:
G1={v1, v2, v3}
G2={v4, v5, v6}
G3={v7, v8, v9, v10}

We derive from G1/G2/G3 and their associated infringement probabilities the new groups:
G1' G2' and G3' defined as follows:
G1'=G1 that is {v1, v2, v3}
G2'=G1 U G2 that is {v1, v2, v3, v4, v5, v6}
G3'=G1 U G2 U G3 that is all the 10 VMs
Associated probabilities to the $G_i'$ may be provided as follows:
G1' has associated prob.: p1'=p1=0.01%
G2' has associated prob.: p2'=p2−p1=0.1%−0.01%=0.09%
G3' has associated prob.: p3'=p3−p2=1.0%−0.1%=0.9%
For each of the $G_i'$ the effective size $ES(G_i')$ associated to homogenous infringement probability $p_i'$ may be computed as follows:
G1' p1' yields ES1
G2' p2' yields ES2
G3' p3' yields ES3
Effective size: ES=max(ES1, ES2, ES3)

Given a VM population and its derived effective size ES computed as explained above, the values of ES may be understood as a capacity requirement for a host in which the 10 VMs would be hosted. If the capacity of the host is at least ES, then each of the VM has an infringement probability which is at most the VM's required infringement probability. To insure that a group of VMs is associated with the right level of priority (e.g., in VMware, the concept of assigning priority is accomplished by way of assigning associating a higher number of shares to a VM or to a sub-set of VMs), in the above example, the shares may be assigned as follows:

G3 has associated SHARES=1 (the lowest priority)
G2 has associated SHARES=G3*100=100
G1 has associated SHARES=G2*100=10000 (the highest priority)

This share setting insures that the hypervisor 112 will prioritize the various VMs as required so that in case of contention the infringement will occur at the less prioritized groups.

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 2A:
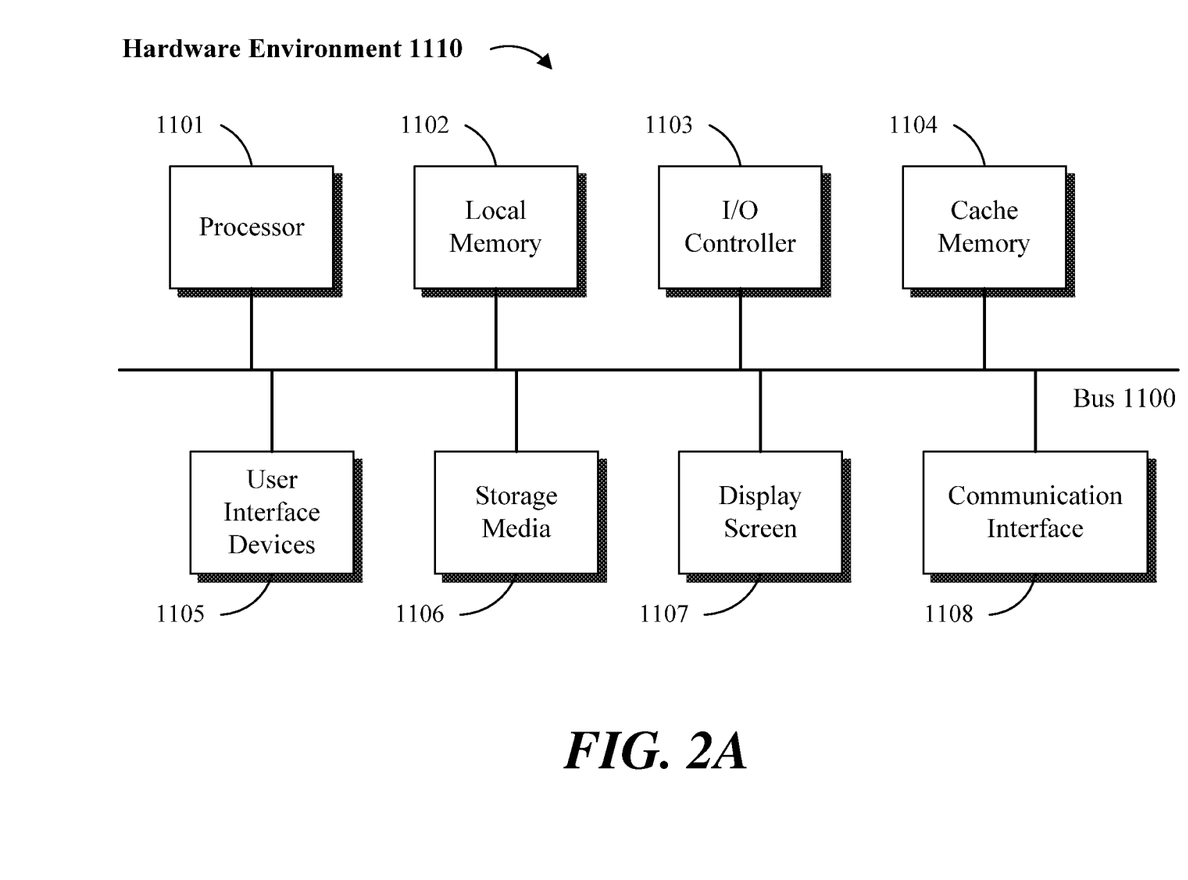
FIGS. 2A and 2B are block diagrams of hardware and software environments in which the disclosed systems and methods may operate, in accordance with one or more embodiments.
Figure 2B:
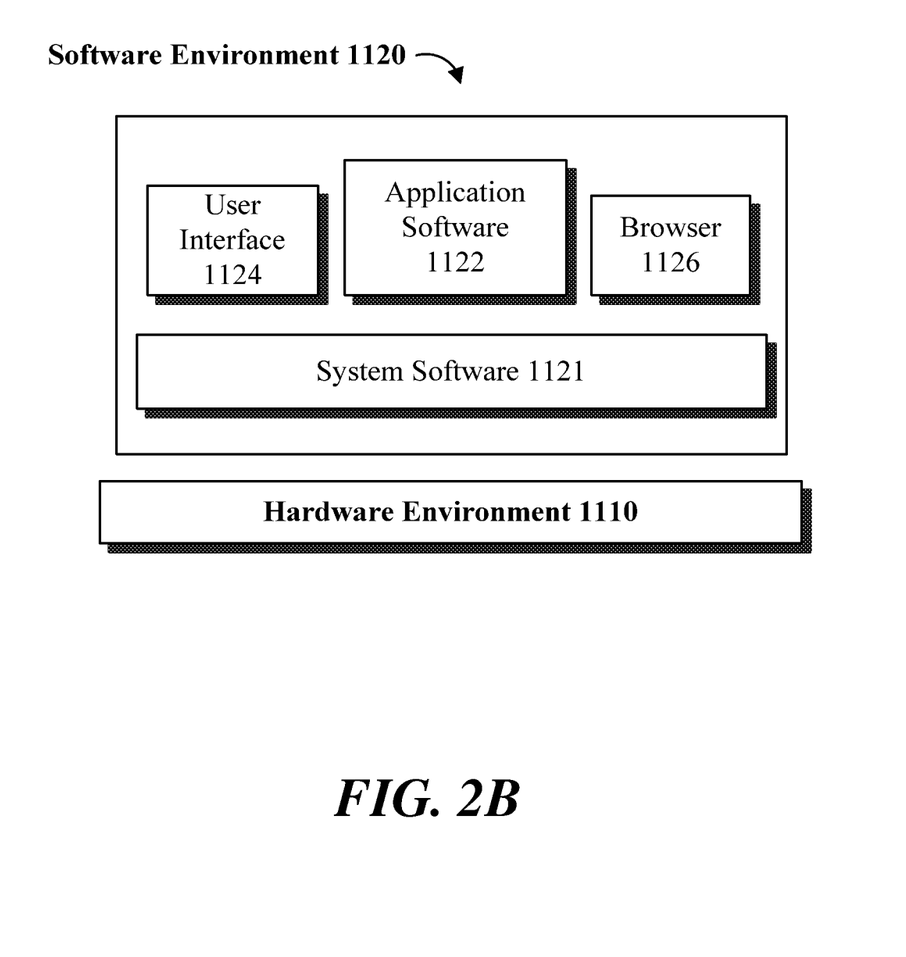

Referring to FIGS. 2A and 2B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 2A, the application software and logic code disclosed herein may be implemented in the form of machine readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD- RAY), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 2B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

Cloud computing is a model of service delivery for enabling convenient, on-demand network access to a shared pool of configurable computing resources (e.g. networks, network bandwidth, servers, processing, memory, storage, applications, virtual machines, and services) that may be rapidly provisioned and released with minimal management effort or interaction with a provider of the service. This cloud model may include at least five characteristics, at least three service models, and at least four deployment models.

Using the on-demand self-service, a cloud consumer may unilaterally provision computing capabilities, such as server time and network storage, as needed automatically without requiring human interaction with the service's provider. Broad network access capabilities may be available over a network and accessed through standard mechanisms that promote use by heterogeneous thin or thick client platforms (e.g., mobile phones, laptops, and PDAs).

Resource pooling allows the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity capabilities may be rapidly and elastically provisioned, in some cases automatically, to quickly scale out and rapidly released to quickly scale in. To the consumer, the capabilities available for provisioning often appear to be unlimited and may be purchased in any quantity at any time. Measured service allows cloud systems automatically control and optimize resource use by leveraging a metering capability at some level of abstraction appropriate to the type of service (e.g., storage, processing, bandwidth, and active user accounts). Resource usage may be monitored, controlled, and reported providing transparency for both the provider and consumer of the utilized service.

Several service models are available, depending on implementation. Software as a Service (SaaS) provides the capability to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS) provides the capability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS) provides the capability to provision processing, storage, networks, and other fundamental computing resources where the consumer is able to deploy and run arbitrary software, which may include operating systems and applications. The consumer does not manage or control the underlying cloud infrastructure but has control over operating systems, storage, deployed applications, and possibly limited control of select networking components (e.g., host firewalls).

Several deployment models may be provided. A private cloud provides a cloud infrastructure that is operated solely for an organization. It may be managed by the organization or a third party and may exist on-premises or off-premises. A community cloud provides a cloud infrastructure that is shared by several organizations and supports a specific community that has shared concerns (e.g., mission, security requirements, policy, and compliance considerations). It may be managed by the organizations or a third party and may exist on-premises or off-premises.

A public cloud may provide a cloud infrastructure that is made available to the general public or a large industry group and is owned by an organization selling cloud services. A hybrid cloud provides a cloud infrastructure that is a composition of two or more clouds (private, community, or public) that remain unique entities but are bound together by standardized or proprietary technology that enables data and application portability (e.g., cloud bursting for load-balancing between clouds).

Figure 3A:
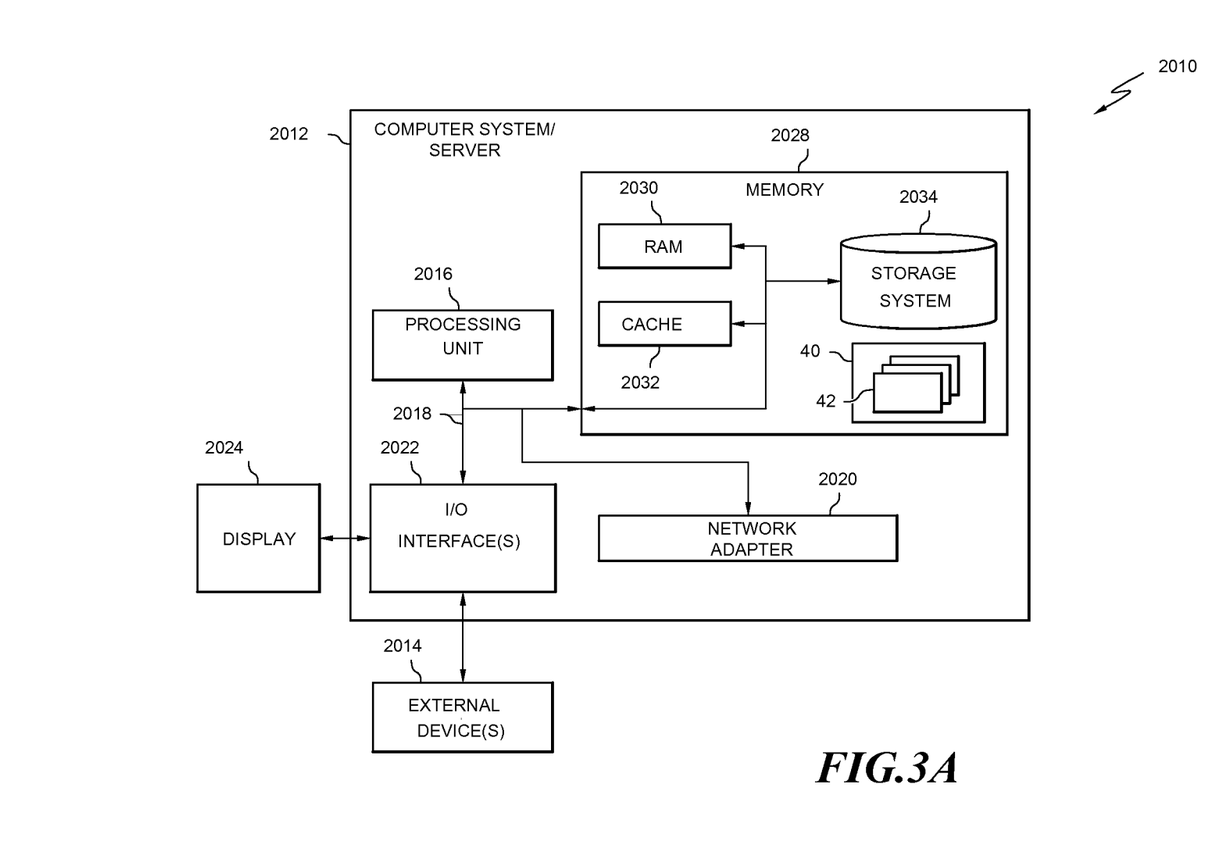
FIGS. 3A, 3B and 3C depict one or more nodes and abstraction model layers in an exemplary network environment that supports a cloud infrastructure, in accordance with one or more embodiments.
Figure 3B:
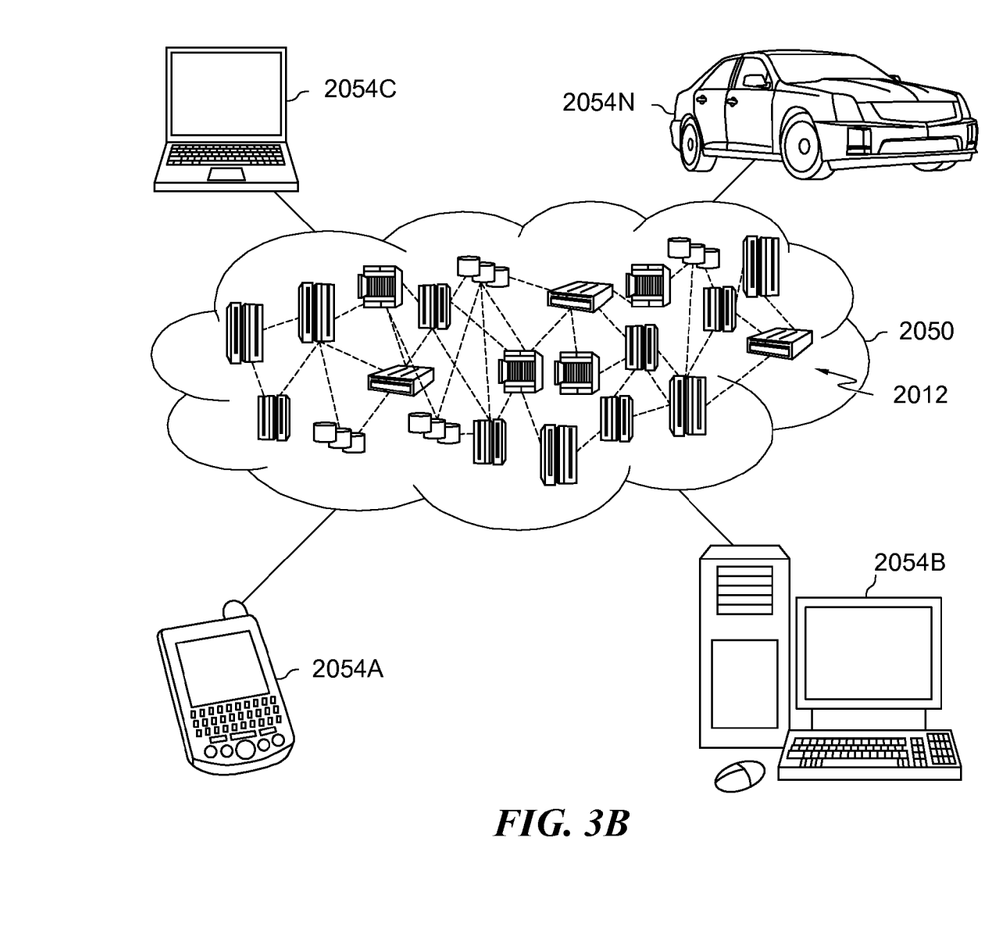
Figure 3C:
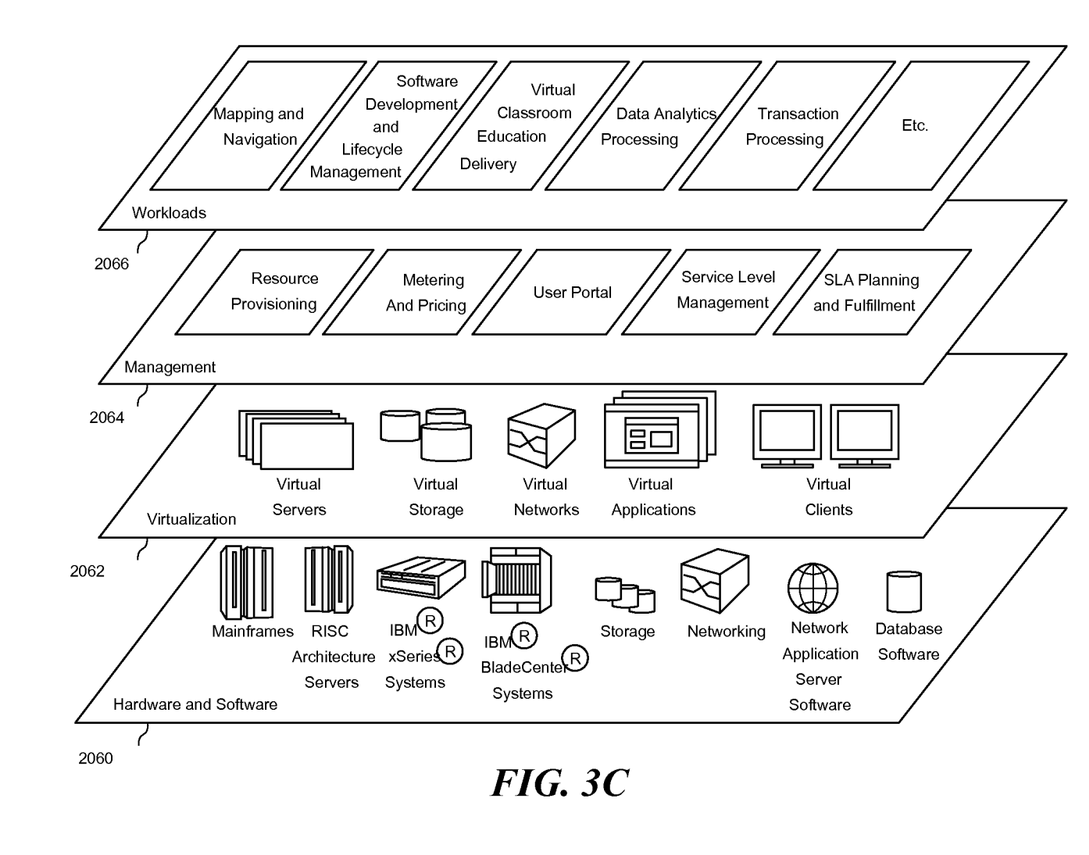

A cloud computing environment is service oriented with a focus on statelessness, low coupling, modularity, and semantic interoperability. At the heart of cloud computing is an infrastructure comprising a network of interconnected nodes. Referring now to FIG. 3C, a schematic of an example of a cloud computing node is shown. Cloud computing node 2010 is one example of a suitable cloud computing node and is not intended to suggest any limitation as to the scope of use or functionality of embodiments described herein. Regardless, cloud computing node 2010 is capable of being implemented and/or performing any of the functionality set forth hereinabove.

In cloud computing node 2010, there is a computer system/server 2012, which is operational with numerous other general purpose or special purpose computing system environments or configurations. Examples of well-known computing systems, environments, and/or configurations that may be suitable for use with computer system/server 2012 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 2012 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 2012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3C, computer system/server 2012 in cloud computing node 2010 is shown in the form of a general-purpose computing device. The components of computer system/server 2012 may include, but are not limited to, one or more processors or processing units 2016, a system memory 2028, and a bus 2018 that couples various system components including system memory 2028 to processor 2016.

Bus 2018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 2012 typically includes a variety of computer system readable media. Such media may be any available media that is accessible by computer system/server 2012, and it includes both volatile and non-volatile media, removable and non-removable media. System memory 2028 may include computer system readable media in the form of volatile memory, such as random access memory (RAM) 30 and/or cache memory 32.

Computer system/server 2012 may further include other removable/non-removable, volatile/non-volatile computer system storage media. By way of example, storage system 34 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided.

In some instances, the above components may be connected to bus 2018 by one or more data media interfaces. As will be further depicted and described below, memory 2028 may include at least one program product having a set (e.g., at least one) of program modules that are configured to carry out the functions of one or more embodiments.

Program/utility 2040, having a set (at least one) of program modules 42, may be stored in memory 2028 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of one or more embodiments.

Computer system/server 2012 may also communicate with one or more external devices 2014 such as a keyboard, a pointing device, a display 2024, etc.; one or more devices that enable a user to interact with computer system/server 2012; and/or any devices (e.g., network card, modem, etc.) that enable computer system/server 2012 to communicate with one or more other computing devices. Such communication may occur via I/O interfaces 2022. Still yet, computer system/server 2012 may communicate with one or more networks such as a local area network (LAN), a general wide area network (WAN), and/or a public network (e.g., the Internet) via network adapter 2020.

As depicted, network adapter 2020 communicates with the other components of computer system/server 2012 via bus 2018. It should be understood that although not shown, other hardware and/or software components could be used in conjunction with computer system/server 2012. Examples, include, but are not limited to: microcode, device drivers, redundant processing units, external disk drive arrays, RAID systems, tape drives, and data archival storage systems, etc.

Referring now to FIG. 3C, illustrative cloud computing environment 2050 is depicted. As shown, cloud computing environment 2050 comprises one or more cloud computing nodes 2010 with which local computing devices used by cloud consumers, such as, for example, personal digital assistant (PDA) or cellular telephone 2052A, desktop computer 2052B, laptop computer 2054C, and/or automobile computer system 2054N may communicate.

Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device.

It is understood that the types of computing devices 52A-N shown in FIG. 3C are intended to be illustrative only and that computing nodes 2010 and cloud computing environment 2050 may communicate with any type of computerized device over any type of network and/or network addressable connection (e.g., using a web browser).

Referring now to FIG. 3C, a set of functional abstraction layers provided by cloud computing environment 2050 (FIG. 3C) is shown. It should be understood in advance that the components, layers, and functions shown in FIG. 3C are intended to be illustrative of one or more embodiments and are not limited thereto. As depicted, the following layers and corresponding functions are provided.

Hardware and software layer 2060 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 2062 provides an abstraction layer from which the following examples of virtual entities may be provided: virtual servers; virtual storage; virtual networks, including virtual private networks; virtual applications and operating systems; and virtual clients. In one example, management layer 2064 may provide the functions described below. Resource provisioning provides dynamic procurement of computing resources and other resources that are utilized to perform tasks within the cloud computing environment.

Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met.

Service Level Agreement (SLA) planning and fulfillment provide pre-arrangement for, and procurement of, cloud computing resources for which a future requirement is anticipated in accordance with an SLA. Workloads layer 2066 provides examples of functionality for which the cloud computing environment may be utilized. Examples of workloads and functions which may be provided from this layer include: mapping and navigation; software development and lifecycle management; virtual classroom education delivery; data analytics processing; transaction processing; etc.

What is claimed is:

1. A method for deciding whether a plurality of virtual machines (VMs) may be hosted on a computing system with resources to support at least one of the VMs, the method comprising:

determining maximum permissible probability of infringement (maxPermInfrProb(v)) for a VM(v), wherein "v" is a value from 1 to n, such that n is the number of VMs in a set G, as stipulated by the VMs' SLA;

partitioning the set G into a plurality of groups $G_i$ ($G_1$, ... $G_i$, ... $G_n$), so that each group is homogenous with respect to maxPermInfrProb defined for members of the group $G_i$;

organizing the groups $G_i$ based on the value of maxPermInfrProb for each $G_i$;

computing an effective size (ES) for the groups $G_i$ with maxPermInfrProb($G_i$) calculated according to statistical recording of resource demand for VMs in the group $G_i$;

wherein total effective size of the group $G_i$ is computer based on the following:

defining a new groups ($G'_1$, ... $G'_i$, ... $G'_n$) such that $G'_i$ is the union $G'_1$, $G'_2$ ... $G'_i$;

assigning to the new groups ($G'_1$, ... $G'_i$, ... $G'_n$) a second threshold that provides maximum permissible probability of infringement (maxPermInfrProb') such that:
maxPermInfrProb' ($G'_1$)=maxPermInfrProb($G_1$)
maxPermInfrProb' ($G'_i$)=maxPermInfrProb ($G_i$)−maxPermInfrProb' ($G_{i−1}$)

wherein the total effective size of the group G equals the maximum over ES($G''_i$).

2. The method of claim 1, where feasibility of hosting the plurality of VMs on the computing system depends on the total effective size of G.

3. The method of claim 1, wherein plurality of virtual machines (VMs) may be hosted on a computing system, in response to determining that the total effective size G is less or equal to the host capacity.

4. The method of claim 3, wherein shares associated with a group $G_i$ are associated such that the share values increase with decreasing value of maxPermInfrProb which permits to arbitrate resources in case of contention by allocating resources according to decreasing value of maxPermInfrProb.

5. A system for deciding whether a plurality of virtual machines (VMs) may be hosted on a computing system with resources to support at least one of the VMs, the system comprising:

one or more computer processors;
one or more computer readable storage media; and computer program instructions stored on the one or more computer readable storage media for execution by at least one of the one or more computer processors, the computer program instructions comprising:

program instructions to determine maximum permissible probability of infringement (maxPermInfrProb(v)) for a VM(v), wherein "v" is a value from 1 to n, such that n is the number of VMs in a set G, as stipulated by the VMs' SLA;

program instructions to partition the set G into a plurality of groups $G_i$ ($G_1, \ldots G_i, \ldots G_n$), so that each group is homogenous with respect to maxPermInfrProb defined for members of the group $G_i$;

program instructions to organize the groups $G_i$ based on the value of maxPermInfrProb for each $G_i$;

program instructions to compute an effective size (ES) for the groups $G_i$ with maxPermInfrProb($G_i$) calculated according to statistical analysis of history of infringement for VMs in the group $G_i$;

wherein total effective size of the group G is computed based on the following:

defining a new groups ($G'_1, \ldots G'_i, \ldots G'_n$) such that $G'_i$ is the union $G_1, \ldots G_2, \ldots G_i$;

assigning to the new groups ($G'_1, \ldots G'_i, \ldots G'_n$) a second threshold that provides maximum permissible probability of infringement (maxPermInfrProb') such that:
maxPermInfrProb' ($G'_1$)=maxPermInfrProb($G_1$)
maxPermInfrProb'($G'_i$), maxPermInfrProb($G_i$)−maxPermInfrProb($G_{i-1}$)

wherein the total effective size of the group $G_i$ equals the maximum over ES($G'_i$).

6. The system of claim 5, where feasibility of hosting the plurality of VMs on the computing system depends on the total effective size of G.

7. The system of claim 5, wherein the plurality of virtual machines (VMs) may be hosted on a computing system, in response to determining that the total effective size of G is less or equal to the host capacity.

8. The system of claim 7, wherein shares associated with a group $G_i$ are associated such that the share values increase with decreasing value of maxPermInfrProb which permits to arbitrate resources in case of contention by allocating resources according to decreasing value of maxPermInfrProb.

9. A computer program product comprising a non-transitory data storage medium having a computer readable program for deciding whether a plurality of virtual machines (VMs) may be hosted on a computing system, wherein the computer readable program when executed on a computer causes the computer to:

determine maximum permissible probability of infringement (maxPermInfrProb(v)) for a VM(v), wherein "v" is a value from 1 to n, such that n is the number of VMs in a set G, as stipulated by the VMs' SLA;

partition the set G into a plurality of groups $G_i$ ($G_1, \ldots G_i, \ldots G_n$), so that each group is homogenous with respect to maxPermInfrProb defined for members of the group $G_i$;

organize the groups $G_i$ based on the value of maxPermInfrProb for each $G_i$;

compute an effective size (ES) for the groups $G_i$ with maxPermInfrProb($G_i$) calculated according to statistical analysis of history of infringement for VMs in the group $G_i$;

wherein total effective size of the group $G_i$ is computed based on the following:

define a new groups ($G'_1, \ldots G'_i, \ldots G'_n$) such that $G'_i$ is the union $G_1, G_2 \ldots G_i$;

assign to the new groups ($G'_1, \ldots G'_i, \ldots G'_n$) a second threshold that provides maximum permissible probability of infringement (maxPermInfrProb') such that:
maxPermInfrProb' ($G'_1$)=maxPermInfrProb($G_1$)
maxPermInfrProb'($G'_i$)=maxPermInfrProb($G_i$)−maxPermInfrProb($G_{i-1}$)

wherein the total effective size of the group G equals the maximum over ES($G''_i$).

10. The computer program product of claim 9, wherein feasibility of hosting the plurality of VMs on the computing system depends on the total effective size of G.

11. The computer program product of claim 9, wherein plurality of virtual machines (VMs) may be hosted on a computing system, in response to determining that the total effective size of G is less or equal to the host capacity.

12. The computer program product of claim 11, wherein shares associated with a group $G_i$ are associated such that the share values increase with decreasing value of maxPermInfrProb which permits to arbitrate resources in case of contention by allocating resources according to decreasing value of maxPermInfrProb.

* * * * *